(12) United States Patent
McConkey

(10) Patent No.: US 9,255,835 B2
(45) Date of Patent: Feb. 9, 2016

(54) SYSTEM FOR REMOTE VIBRATION DETECTION ON COMBUSTOR BASKET AND TRANSITION IN GAS TURBINES

(75) Inventor: Joshua S. McConkey, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 632 days.

(21) Appl. No.: 13/591,635

(22) Filed: Aug. 22, 2012

(65) Prior Publication Data

US 2014/0053574 A1     Feb. 27, 2014

(51) Int. Cl.
  *G01H 9/00*     (2006.01)
  *F23N 5/08*     (2006.01)

(52) U.S. Cl.
  CPC ............... *G01H 9/00* (2013.01); *F23N 5/082* (2013.01); *F23R 2900/00013* (2013.01)

(58) Field of Classification Search
  CPC ......... G01H 9/00; G01H 9/004; G01H 9/006; F23N 5/082; F23R 2900/00013; F23R 2900/00006
  USPC .......... 73/590, 655, 657, 660; 60/773, 39.281
  See application file for complete search history.

(56) References Cited

U.S. PATENT DOCUMENTS

| | | | |
|---|---|---|---|
| 3,635,018 A | | 1/1972 | Decorso et al. |
| 3,899,882 A | | 8/1975 | Parker |
| 4,248,093 A | | 2/1981 | Andersson et al. |
| 4,557,106 A | | 12/1985 | Ffowcs Williams et al. |
| 5,544,478 A | | 8/1996 | Shu et al. |
| 5,684,718 A | * | 11/1997 | Jenkins et al. .................. 702/57 |
| 5,828,797 A | | 10/1998 | Minott et al. |
| 6,354,071 B2 | | 3/2002 | Tegel et al. |
| 6,461,144 B1 | | 10/2002 | Gutmark et al. |
| 7,533,572 B2 | | 5/2009 | Twerdochlib |
| 8,042,412 B2 | | 10/2011 | Xia et al. |
| 8,256,297 B2 | * | 9/2012 | Sue ............................ G01H 9/00 73/643 |
| 2002/0005037 A1 | | 1/2002 | Tegel et al. |
| 2005/0034463 A1 | * | 2/2005 | Simpson et al. ................ 60/775 |
| 2005/0144955 A1 | | 7/2005 | Handrlsman et al. |
| 2006/0075755 A1 | | 4/2006 | Haertel et al. |
| 2009/0302242 A1 | | 12/2009 | Papadopoulos |
| 2011/0048021 A1 | * | 3/2011 | Slobodyanskiy et al. ...... 60/725 |
| 2011/0174053 A1 | * | 7/2011 | Holt ............................. 73/23.31 |
| 2011/0239621 A1 | | 10/2011 | Meneely et al. |

OTHER PUBLICATIONS

Nicola Paone, et al. "Laser Vibration Measurements Through Combustive Flows: Application to an Industrial Burner in Working Conditions". In Measurements, vol. 28, No. 1, Jul. 1, 2000 (pp. 21-31).

Artur Pozarlik. "Vibro-Acoustical Instabilities Induced by Combustion Dynamics in Gas Turnbine Combustors". Dec. 3, 2010, University of Twente, Enschede, NL (33 Pages).

* cited by examiner

*Primary Examiner* — Laura Martin
*Assistant Examiner* — Rose M Miller

(57) ABSTRACT

A gas turbine combustor vibration sensing system includes a non-contact reflective optical vibration sensor adapted for reflecting photons off of a component within the combustor with a photon source and receiving reflected photons with a photon detector. Exemplary combustor internal components include the combustor basket or transition. A vibration analyzer is coupled to the vibration sensor, for correlating photons received by the detector with vibration characteristics of the component. Vibration characteristics in turn can be correlated with combustion characteristics, including by way of example flame front position and flameout conditions. Vibration characteristic information may be used as an operational parameter by a turbine monitoring system to modify operation of a gas turbine.

8 Claims, 2 Drawing Sheets

SYSTEM FOR REMOTE VIBRATION DETECTION ON COMBUSTOR BASKET AND TRANSITION IN GAS TURBINES

BACKGROUND OF THE INVENTION

1. Field of the Invention

The invention relates to vibration detection in gas combustion turbine combustors and more particularly to a system for remote vibration detection on the combustor basket and/or transition in gas turbines during their operation. Vibration is detected with one or more non-contact reflective optical vibration (NROV) sensors that are positioned within the combustor housing and reflect photons off the combustor basket and/or transition combustion containment components that are also within the housing. The sensed vibration characteristics can be associated with combustion flame characteristics, and used as a turbine operation monitoring parameter.

2. Description of the Prior Art

Monitoring of steady state and transient vibration characteristics within a gas turbine combustor section, and especially the combustor basket and transition combustion containment components are desirable tools for turbine design and operation. Those components are susceptible to induced vibration excitation caused by combustion gas dynamics A multitude of factors and operating conditions provide for efficient and clean combustion dynamics within the gas turbine combustor section during ongoing operation. Although a stable lean mixture is desired for fuel efficiency and for environmentally acceptable emissions, unstable engine operating conditions must be avoided. Not only is the fuel/air mixture important: also relevant to gas turbine operation are the shape and location of the combustion flame front within the combustion containment components, including the combustor basket and transition. Given the efficiency and emissions criteria, the operation of gas turbines requires a balancing of design and operational approaches to maintain efficiency, meet emission standards, and avoid vibrational, excessive pressure and/or thermal damage due to undesired combustion dynamics characteristics.

Thus during gas turbine engine design and subsequent field operation it is beneficial to monitor combustion vibration characteristics that are impacted by combustion characteristics such as: flame shape and flame front position; pressure variations; thermoacoustic vibrations induced by combustion temperature and/or pressure variations that may damage combustor components; flashback and/or combustion flameout within one or more of the engine's combustors. The monitored vibration and combustion characteristics are then used as a control parameter for engine operation. For example, if a combustor flameout is detected, a typical control response is to shut fuel supply to at least the affected combustor, if not the entire engine. In another example, if a flashback condition is detected, a typical control response is to increase air intake pressure and/or flow rate into the combustor.

Vibration and combustion characteristic direct monitoring with instruments is difficult given the local pressure and temperature conditions within a combustor, and particularly within the combustor basket and transition combustion containment components. Known combustion characteristic monitoring instrumentation include single thermocouple or thermocouple arrays oriented within the combustor, that associate temperature and/or changes in temperature with combustion characteristics. However, temperature information alone does not provide information about combustor vibration characteristics. Other known combustion characteristic monitoring instrumentation include one or pressure transducers (such as piezo-electric transducer) oriented within the combustor, that associate pressure and/or changes in pressure with combustion characteristics. Pressure transducers can also monitor thermoacoustic vibrations induced by combustion temperature and/or pressure variations that may damage combustor components, so that useful vibration monitoring information is available for turbine design and operation. Some proposed known combustion monitoring optical systems associate flame luminescence with combustion thermoacoustic vibration characteristics, eliminating the need for a pressure transducer to perform the same vibration monitoring function. These optical sensors measure changes in combustion flame luminescence (e.g., in any of the infrared, visible light or ultraviolet spectra) and may include optical pipes inserted within the combustor that are coupled to photodiode detectors located outside or inside the combustor housing. Combustion monitoring by laser-optical sensors employing backscatter, diffraction or phase-Doppler principles have been proposed for monitoring cooling water injection content and droplet distribution within the combustor, but they do not provide vibration monitoring information.

Other known combustor vibration monitoring systems utilize accelerometers that can also associate sensed vibration characteristics with combustion characteristics. The accelerometers can be mounted inside or outside the combustor housing. Accelerometers, or for that matter any type of monitoring sensor that is mounted within the combustor, are susceptible to damage from hot pressurized combustion gasses, reducing their potential service reliability. Failed combustion monitoring sensors mounted within combustors require engine shutdown—hence service interruption—to facilitate their replacement. If the accelerometer or other vibration sensor is mounted to internal combustor components, full combustor tear-down may be required to replace them. If accelerometers or any other vibration measuring sensors are affixed to a combustion containment component, such as a combustor basket or transition, they may also negatively impact vibration characteristics of the component itself—for example by introduction of unbalanced undamped mass. Additionally, if an accelerometer or other vibration measuring sensor inadvertently separates from an attachment point within the combustor it may cause internal damage to other components. While accelerometers or other combustion/vibration monitoring sensors may also be mounted external the combustor housing, avoiding all of the above-noted disadvantages, they may not offer the same monitoring sensitivity and/or response rate as those mounted within the combustor housing due to, among other things, housing vibration attenuation or propagation delay.

Thus, a need exists in the art for a gas turbine combustor vibration monitoring system that functions reliably despite high temperature and pressure conditions within an operating combustor.

Another need exists in the art for a gas turbine combustor vibration monitoring system that provides high monitoring sensitivity and response, without adversely impacting vibrational characteristics of combustor internal components.

An additional need exists in the art for a gas turbine combustor vibration monitoring system facilitates association of sensed vibration characteristics with combustion characteristics, and the characteristic information used as an operating parameter by the turbine monitoring system to modify operation of the gas turbine.

SUMMARY OF THE INVENTION

Accordingly, an object of the invention is to monitor combustion characteristics within a gas turbine combustor in a reliable manner, despite high temperature and pressure conditions within an operating combustor.

Another object of the invention is to monitor gas turbine combustor vibration with high monitoring sensitivity and response, without adversely impacting vibration characteristics of combustor internal components.

An additional object of the invention is to facilitate association of sensed vibration characteristics with combustion characteristics, and the characteristic information used as an operating parameter by the turbine monitoring system to modify operation of the gas turbine.

These and other objects are achieved in accordance with the present invention by embodiments of the gas turbine combustor vibration sensing system that include a non-contact reflective optical vibration sensor adapted for reflecting photons off of a component within the combustor with a photon source and receiving reflected photons with a photon detector. Exemplary combustor internal components include the combustor basket or transition. The non-contact optical sensor does not influence vibration characteristics of the combustor internal component, and can be replaced without full combustor tear-down by removal and replacement through a housing inspection port. The non-contact optical sensor is spaced from the combustor internal component and thus operates at a lower temperature than the internal component. A vibration analyzer is coupled to the non-contact vibration sensor, for correlating photons received by the detector with vibration characteristics of the component. Vibration characteristics in turn can be correlated with combustion characteristics, including by way of example flame front position and flameout conditions. Vibration characteristic information may be used as an operational parameter by a turbine monitoring system to modify operation of a gas turbine.

Embodiments of the present invention feature a method for sensing vibration in a gas turbine combustor, by reflecting photons off of a component within the combustor with a photon source of a non-contact reflective optical vibration sensor and receiving reflected photons with a photon detector of the vibration sensor. A vibration analyzer is used to correlate photons received by the detector with vibration characteristics of the component.

Other embodiments of the present invention feature a gas turbine combustor vibration sensing system having a non-contact reflective optical vibration sensor adapted for reflecting photons off of a component within the combustor with a photon source and receiving reflected photons with a photon detector. A vibration analyzer is coupled to the vibration sensor, for correlating photons received by the detector with vibration characteristics of the component.

Additional embodiments of the present invention feature a gas turbine system having a combustor, with a combustor housing including combustor basket and transition components. A combustor vibration sensing system is coupled to the combustor, having a non-contact reflective optical vibration sensor in communication with an interior of the combustor housing. The vibration sensor reflects photons off of at least one of the components with a photon source and receives reflected photons with a photon detector. A vibration analyzer is coupled to the vibration sensor, for correlating photons received by the detector with vibration characteristics of the component.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in a gas turbine combustor vibration sensing system, which includes a non-contact reflective optical vibration sensor adapted for reflecting photons off of a component within the combustor with a photon source and receiving reflected photons with a photon detector. Exemplary combustor internal components suitable for vibration monitoring include the combustor basket or transition. The non-contact sensor does not have to be mounted within the combustor casing so long as the transmitter and receiver have optical line of sight alignment with the combustor basket or transition. Thus it does not impact inherent vibration characteristics of the combustor internal components, is easily installed, replaced or reconfigured in the field via a combustor housing inspection port, and cannot break loose from an internal mounting position where it might cause internal damage to the combustor. A vibration analyzer is coupled to the vibration sensor, for correlating photons received by the detector with vibration frequency and/or magnitude characteristics of the component. Vibration characteristics in turn can be correlated with combustion characteristics, including by way of example flame front position and flameout conditions. Vibration characteristic information may be used as an operational parameter by a turbine monitoring system to modify operation of a gas turbine.

Figure 1:
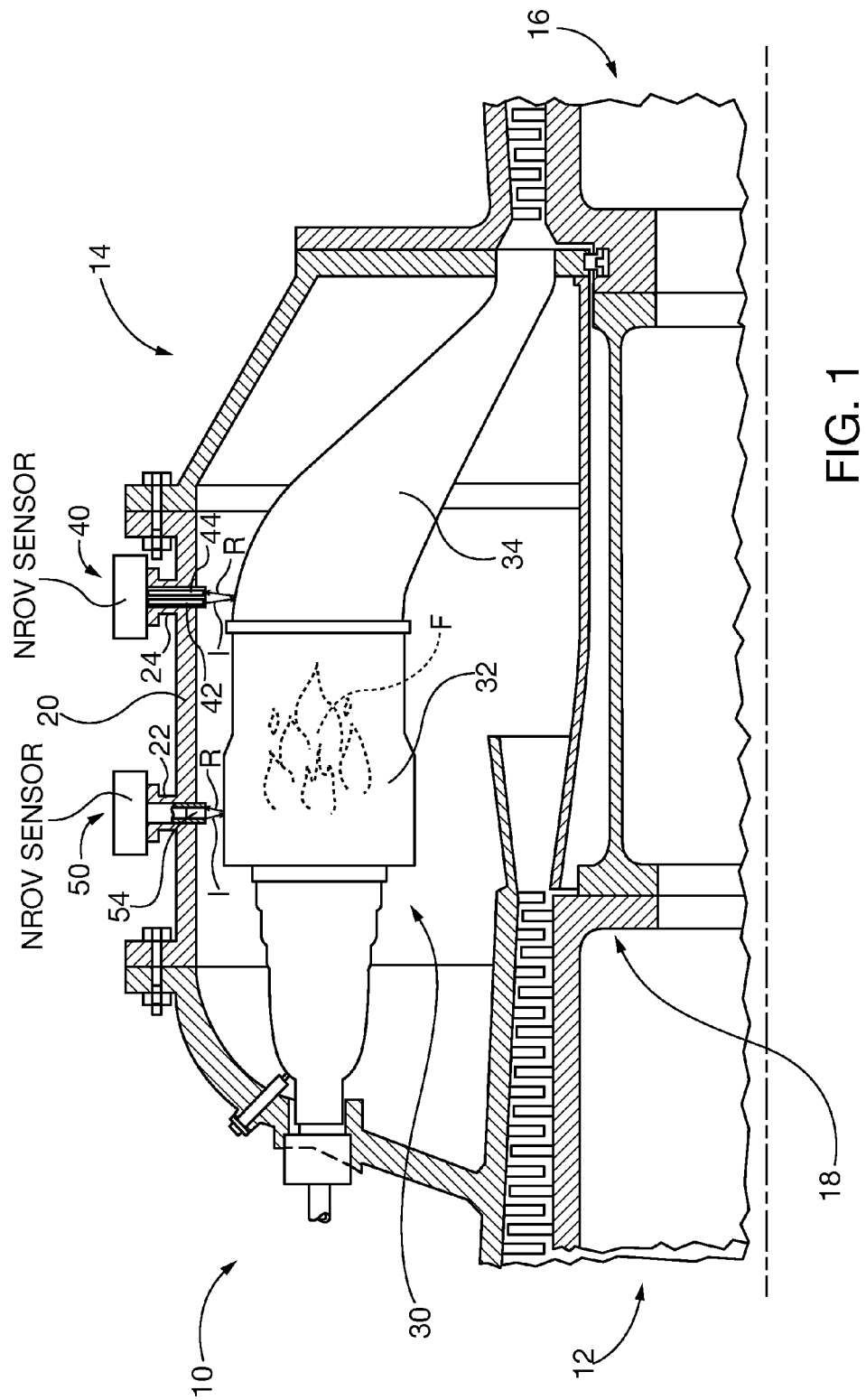
FIG. 1 is a schematic, partial cross-sectional elevational view of a gas turbine including an exemplary embodiment of the vibration sensing system of the present invention.

FIG. 1 shows an exemplary combustion gas turbine 10 of known construction, having a compressor section 12, a combustor section 14 and a turbine section 18, through all of which is oriented rotor 18. The combustor section 14 includes a combustor housing 20 that contains the high temperature pressurized combustion gases, which impart rotation on turbine blades within the turbine section 16. Generally a gas turbine combustion section 14 has a plurality of circumferentially oriented combustors, and only one exemplary combustor is shown in FIG. 1. Combustion containment component section 30 includes combustor basket 32 and transition 34 that isolate the combustion flame front F within the combustor section 14. The flame front F pulsates and varies position dynamically within the combustor containment component section 30. The flame front F pulsation position and intensity vibrate the combustion containment component section 30, including the combustor basket 32 and transition 34. Their vibration characteristics are correlated with combustion characteristics, for example flame front positions or a flameout condition.

Figure 2:
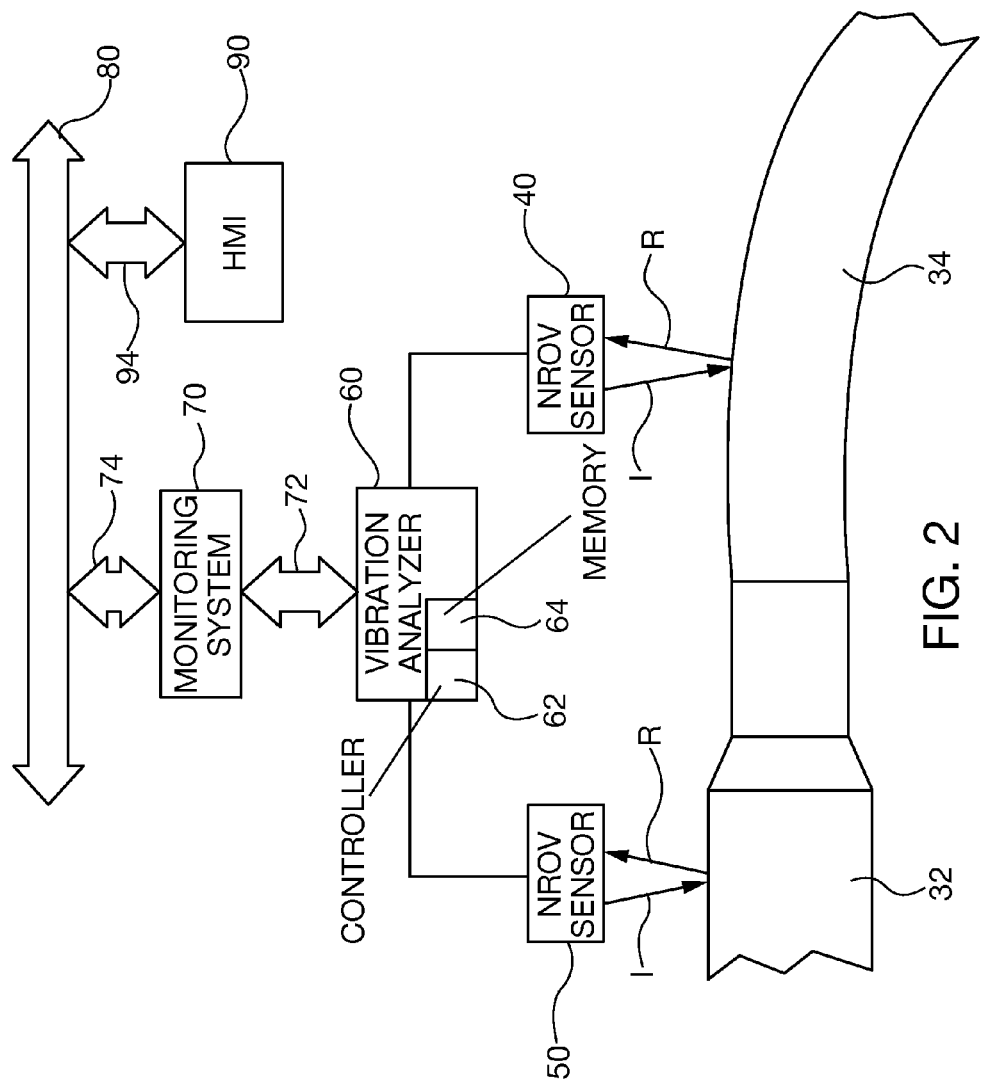
FIG. 2 is a block diagram of an exemplary embodiment of the vibration sensing system of the present invention.

In the exemplary embodiment of FIGS. 1 and 2 the vibration sensing system of the present invention includes two non-contact reflective optical vibration (NROV) sensors 40, 50 in communication with the combustor housing interior. While two NROV sensors are shown, a single sensor or more than two sensors may be utilized in an individual combustor. Similarly, each individual combustor in the combustor section 14 may utilize one or more NROV sensors. As shown in FIGS. 1 and 2 the respective NROV sensors 40, 50 reflect reflecting photons off of at least one of the combustion containment components 30 with a photon source (often a coherent photonic beam laser source) along a path I and receiving reflected photons with a photon detector (e.g., a solid-state charged coupled device) along the path R. The NROV sensors 40, 50 are of known construction and can utilize laser intensity, laser interferometry or laser Doppler sensing principles that correlate relative position of the sensor and the reflective surface.

Operation and function of an exemplary NROV sensor adapted for electrical generator vibration monitoring is shown and described in U.S. Pat. No. 7,533,572 "High Bandwidth Fiber Optic Vibration Sensor", the entire contents of which is incorporated herein by reference. Changes in vibrational relative position frequency and amplitude can be monitored by vibration analyzer 60.

Exemplary NROV sensors 40 and 50 are inserted in inspection ports 22, 24 formed within the housing, so that their respective sources and detectors are in optical line of sight with exterior surfaces of the respective paired transition 34 and combustor basket 32. Sensor 40 includes fiber optic pipe assemblies 42, 44 of known construction, which are coupled respectively to its source and detector. Both of the fiber optic pipes 42, 44 are capable of operating within the relatively harsh temperature and pressure conditions of the combustor section 14 interior, so that the remainder of the sensor 40 source and detector components remain outside the gas turbine. The sensor 50 has an optical tube 52 with a high temperature resistant optical window 54 that is inserted into the inspection port 22 and in communication with the combustor section 14 interior. In this way the remainder of sensor 50 components remains outside the gas turbine. While the exemplary embodiment of FIG. 1 has a single sensor in each of inspection ports 22, 24, more than one sensor may be inserted in one access port, and each of the multiple sensors can be oriented to project and receive reflected photons from different combustor components (e.g., the combustor basket 32 and the transition 34, or different portions of one component (e.g., the upstream and downstream end of the combustor basket 32). By way of example, multiple sensors can be accommodated in a single inspection port 22, 24 by inserting and separately orienting a plurality of fiber optic pipes 42, 44 for different sensors therein or by adding an optical prism in series with the optical window 54 within the optical tube 52.

NROV sensors 40, 50 are coupled to a known vibration analyzer 60 that controls each sensor and converts sensor detector readings to sensed vibration frequency and/or magnitude characteristics. The vibration analyzer 60 includes a controller 62 and operating implementing software and/or firmware instruction sets stored in accessible memory 64 for implementing the detector reading to vibration characteristic association. Combustor basket 32 and/or transition 34 vibration characteristics are communicated by vibration analyzer 60 to a gas turbine monitoring system 70 by communication pathway 72. The gas turbine monitoring system 70 can associate the vibration characteristic information with turbine operating conditions and use that information as a control or other operational parameter for running the gas turbine 10. For example if the gas turbine monitoring system 70 associates a vibrational characteristic with a flameout condition, it can cause the combustor fuel injector to cease supplying fuel to the combustor section 14. The gas turbine monitoring system 70 communicates via communication pathway 74 to a power plant control system communication bus 80, where operating conditions including by way of example vibration characteristics sensed by the NROV sensors 40, 50, can be monitored by plant operators via human machine interface (HMI) 90. Thus human operators can also utilize monitored vibrational characteristic information when operating the power plant.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for sensing combustion-induced vibration characteristics in a gas turbine engine combustor, comprising:
    providing an operating gas turbine engine, which includes a combustor having a combustor housing, which defines an interior including therein combustor basket and transition components that entrain combustion gasses, and an inspection port in communication with the housing interior that is accessible from outside the housing, the inspection port including therein at least one optical pipe or optical window for preventing combustion gas escape from the housing interior;
    providing a non-contact reflective optical vibration sensor in optical communication with the respective inspection port optical pipe or window and the respective combustor basket or transition components, the sensor having a photon source and photon detector oriented outside the combustor housing;
    providing a vibration analyzer coupled to the non-contact reflective optical vibration sensor that correlates photons received by the photon detector with vibration frequency and/or magnitude characteristics;
    providing a gas turbine engine monitoring system, coupled to the vibration analyzer, the monitoring system capable of associating vibration characteristics sensed by the sensor with operating engine vibration characteristics that are indicative of combustion gas flame front position or a flameout condition;
    reflecting photons off of an exterior circumferential surface of the combustor basket or the transition component within the operating combustor with the photon source;
    receiving reflected photons with the photon detector
    correlating, with the vibration analyzer and the monitoring system, photons received by the detector with vibration characteristics of the corresponding combustor basket or transition component and identifying operating engine combustion gas flame front position or a flameout condition therewith.

2. The method of claim 1, comprising using component vibration characteristics as an operational parameter for operating the gas turbine.

3. The method of claim 1, the vibration sensor comprising a laser intensity sensor.

4. The method of claim 1, the vibration sensor comprising a laser interferometry sensor.

5. The method of claim 1, the vibration sensor comprising a laser Doppler sensor.

6. The system method of claim 1, the vibration sensor further comprising at least one fiber optic cable inserted within the inspection port, coupled to the photon source.

7. The method of claim 1, the vibration sensor further comprising at least one fiber optic cable inserted within the inspection port, coupled to the detector.

8. The method of claim 1, the vibration sensor further comprising an optical tube and optical window inserted within the inspection port.

* * * * *